United States Patent [19]
Horan

[11] Patent Number: 5,581,660
[45] Date of Patent: Dec. 3, 1996

[54] NEURAL NETWORK STRUCTURE HAVING LATERAL INTERCONNECTIONS

[75] Inventor: Paul Horan, Dublin, Ireland

[73] Assignee: Hitachi, Ltd., Tokyo, Japan

[21] Appl. No.: 208,328

[22] Filed: Mar. 10, 1994

[30] Foreign Application Priority Data

Mar. 16, 1993 [IE] Ireland ..................... 930200

[51] Int. Cl.[6] ................. G06E 1/00; G06E 3/00
[52] U.S. Cl. ................ 395/25; 395/21; 395/24
[58] Field of Search .............. 395/20–27; 382/153–159, 382/107; 359/1–10, 107, 245, 306, 310; 364/807, 513, 822

[56] References Cited

U.S. PATENT DOCUMENTS

| | | | |
|---|---|---|---|
| 4,893,255 | 1/1990 | Tomlinson, Jr. | 395/24 |
| 5,004,309 | 4/1991 | Caulfield et al. | 359/1 |
| 5,033,103 | 7/1991 | Sillart | 382/54 |
| 5,109,425 | 4/1992 | Lawton | 382/107 |
| 5,121,231 | 6/1992 | Jenkins et al. | 359/7 |
| 5,129,041 | 7/1992 | Pernick et al. | 395/25 |
| 5,151,969 | 9/1992 | Petsce | 395/24 |
| 5,206,541 | 4/1993 | Boahen et al. | 395/24 |
| 5,235,440 | 8/1993 | Clark et al. | 359/10 |

FOREIGN PATENT DOCUMENTS 0349007  1/1990  European Pat. Off. ......... G06G 7/60

OTHER PUBLICATIONS

Kam et al, "Design of two architectures of asynchronous binary nerual networks using linear programming"; Proceedings of the 29th IEEE Conference on Decision and Control, pp. 2766–2767 vol. 5, 5–7 Dec. 1990.

Bhatia et al, "Single layer edge detector with competitive unsupervised learning"; 1991 IEEE International Joint Conference on Neural Networks, pp. 634–639 vol. 1, 18–21 Nov. 1991.

Sheu et al, "An analog nerural network processor for self–organizing mapping"; 1992 IEEE International Solid- State Circuits Conference, pp. 136–137, 19–21 Feb. 1992.

Marshal, "Development of perceptual context–sensitivity in unsupervised neural networks: parsing, grouping, and segmentation"; IJCNN, pp. 315–320 vol. 3, 7–11 Jun. 1992.

Cheng et al, "Distribution of winners in local lateral inhibition"; IJCNN, pp. 456–461 vol. 3, 7–11 Jun. 1992.

Rybak et al, "Neural network modeling in studying neuron mechanisms of visual perception"; RNNS/IEEE symposium on neuroinformatics and neurocomputers, pp. 323–333 vol. 1, 7–10 Oct. 1992.

Bachmann et al, "Classification of simulated radar imagery using lateral inhibition neural networks"; Neural networks for signal processing II. Proceeding os the IEEE–SP workshop, pp. 279–288, 31 Aug.–2 Sep. 1992.

Petrisor et al, "Volume holographic interconnection and copying architectures based on incoherent/coherent source array"; Fourth International Conference on Holographic systems, components and applications, pp. 21–26, 13–15 Sep. 1993.

Kawakami et al, "Bidirectional optical learnable neural networks for OEIC"; 1991 IEEE International Joint Conference on Neural Networks (IJCNN), pp. 1711–1716 vol. 2, 18–21 Nov. 1991.

(List continued on next page.)

Primary Examiner—Tariq R. Hafiz
Attorney, Agent, or Firm—Kenyon & Kenyon

[57] ABSTRACT

A neural network layer (1) is made up of nodes or neurons which each comprise a pair of physically separate and optically coupled sub-units ($X_1$, $Y_1$). One sub-unit broadcasts excitatory and receives inhibitory signals, whereas the other sub-unit broadcasts inhibitory and receives the excitatory signals. An electrical feedback connection (20) is provided between corresponding sub-units for determination of net node activation. Diffractive or holographic optical elements (2) are used for optical coupling.

44 Claims, 6 Drawing Sheets

OTHER PUBLICATIONS

Optics Letters, vol. 16, No. 13, Jul. 1, 1991, Optical Society of America by Wataru Kawakami et al.: *Lateral inhibitory action in an optical neural network using an internal–light–coupled optical device array.*

Japanese Journal of Applied Physics, vol. 32, No. 18, Jan. 1993, Tokyo, Japan, pp. 442–446, Ishiwara: *Proposal of Adaptive–Learning Neuron Circuits with Ferroelectric Analog–Memory Weights.*

Research Disclosure, No. 32954, Sep. 1991, Emsworth, GB, p. 672, Disclosed Anonymously: *Optical Coupling of Neighboring Neurons in Neural Networks.*

Optical Engineering, vol. 29, No. 9, Sep. 1990, Bellingham, US, pp. 1107–1113, Lu et al.: *Self–organizing optical neural network for unsupervised learning.*

Optics Letters, vol. 14, No. 18, 15 Sep. 1989, Optical Society of America by Wataru Kawakami et al.: *Demonstration of an optical inhibitory neural network.*

SPIE Proceedings on Photonics for Computers, Neural Networks, and Memories, vol. 1773, Jul. 1992, San Diego, US, pp. 36–43, Chao et al.: *Optical Implementation of a Shift–Invariant Neocognitron.*

NEURAL NETWORK STRUCTURE HAVING LATERAL INTERCONNECTIONS

BACKGROUND OF THE INVENTION

The invention relates to a lateral neural network structure comprising a layer having a plurality of neurons comprising means for optical lateral interconnection.

Neural networks are generally classified in one of three classes, feedforward, recurrent and lateral. In the feedforward type, neuron connections are only in the forward direction, whereas in the recurrent type, they are both forward and backward. In the lateral type, there are lateral connections between neurons of at least one layer. These connections may be inhibitory (negative) and/or excitatory (positive). The invention relates to neural networks of this type.

Use of lateral neural networks is important for some processing applications. One such application is retinal processing. Features of retinal processing are contrast enhancement and local intensity independence. For example, in U.S. Pat. No. 5,033,103, a system is disclosed which enhances edges, eliminates brightness variations and suppresses noise.

Lateral neural networks are also important in achieving unsupervised and self-organising sub-systems. Large scale lateral inhibition can give rise to competitive or "winner-take-all" behaviour within an area defined by the range of the inhibition. When excitatory connections are used also, topographic or computational mapping can be established. This is because if a particular node responds to a given input, nearby nodes may also partly respond. There is extensive evidence from neuroscience as to the importance of topographic mappings and indeed it is regarded as being a building block in the infrastructure of information processing in the nervous system.

At present, most electronic and opto-electronic neural networks have inhibitory connections only. Optics have major advantages for the implementation of such dense, recurrent type interconnections. An example of such a network is disclosed in the paper "Lateral inhibitory action in an optical neural network using an internal-light-coupled optical device array" by Wataru Kawakami, Ken-ichi Kitayama, Yoshinori Nakano and Masahiro Ikeda in Optics Letters Vol 16, No. 13 Jul. 1, 1991. In this paper, a structure is disclosed whereby each neuron comprises a light-emitting section surrounded by a detecting section for inhibitory interconnections. In the neuron, an array plane and a reflector have holes which must be aligned so that almost all the external light input through the hole which corresponds to an excitatory signal illuminates the light emitting section of the unit. Although it is known to provide both inhibitory and excitatory lateral interconnections in an electrical neural network, as described in European Specification No. 0 349 007 (Hitachi), this is more difficult to achieve optically because light is a positive, definite quantity. The previous approach has been to differentiate the signals by some means such as by wavelength or polarisation, with individual sources and detectors. This enforces very high tolerances on aligning the individual sources with the diffractive elements and detectors and also greatly complicates the individual pixel layout.

The invention is directed towards overcoming these problems.

BRIEF SUMMARY OF THE INVENTION

The invention is characterised in that at least some of the neurons of the network structure layer each comprise two or more physically separate optical sub-units, and the layer comprises means for optically coupling sub-units in a bi-directional manner for broadcasting both inhibitory and excitatory lateral signals.

The use of separate sub-units is a relatively simple way of achieving the ability to have both inhibitory and excitatory lateral interconnections. Accordingly, many different interconnection schemes may be employed optically.

In one embodiment, sub-units constructed for broadcasting lateral inhibitory signals are located for reception of lateral excitatory signals and of external inhibitory inputs, and sub-units constructed for broadcasting lateral excitatory signals are located for reception of lateral inhibitory signals and of external excitatory inputs.

This arrangement provides simplicity in the manner by which the layer is used—external signals almost directly providing appropriate lateral interconnectivity.

In another embodiment, the layer comprises a feedback connection between sub-units.

This is a simple way of providing for determination of net node activation.

The feedback connection may be a one-to-one connection between sub-units of a single neuron.

The sub-units may comprise on-chip light sources.

Alternatively, the sub-units may be constructed to receive light from an external source and comprise on-chip modulators for the received light.

The on-chip modulators may be of the GaAs asymmetric Fabry-Perot type.

In a further embodiment, the external source may be modulated. In providing light modulation of the sub-units, much depends on requirements and density of the layer.

In one embodiment, the optical coupling means comprises holographic or diffractive optical elements.

In another embodiment, the optical coupling means is variable with time. In this embodiment, the optical coupling means may comprise a computer-generated holographic pattern. This is very important where interconnectivity is required to change with time.

According to another aspect, the invention provides an image processing system incorporating a neural network structure as described above.

In a still further aspect, the invention provides a self-organising neural network structure as described above.

BRIEF DESCRIPTION OF THE DRAWINGS

The invention will be more clearly understood from the following description of some embodiments thereof, given by way of example only with reference to the accompanying drawings in which.

DETAILED DESCRIPTION

Figure 1A:
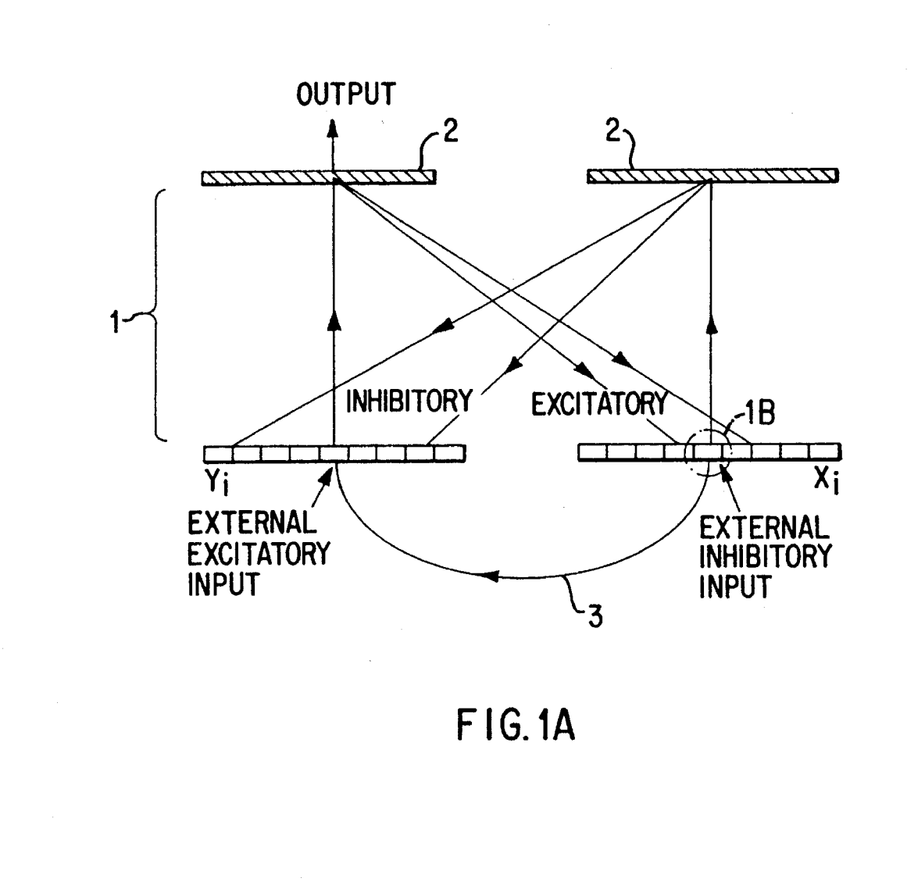
FIG. 1 is a diagrammatic view showing part of a neural network of the invention with an exploded view of part of a neuron.
Figure 1B:
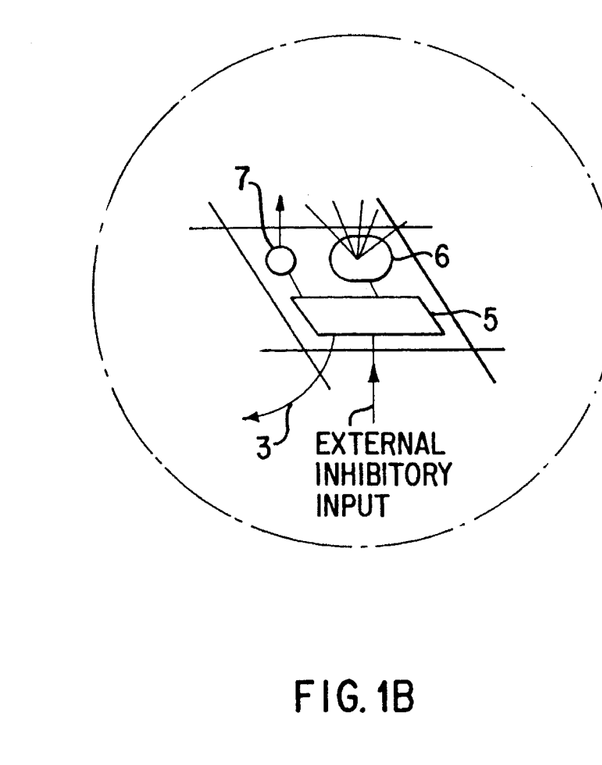

Referring to the drawings, and initially to FIG. 1, a neural network layer i of the invention is illustrated. The layer 1 comprises a series of neurons, each comprising a pair of optically coupled, but physically separate pixel sub-units $X_i$ and $Y_i$. The sub-units $X_i$ and $Y_i$ are coupled optically by a series of diffractive optical elements 2, the construction and locations of which set the manner of optic coupling. In addition, there is a one-to-one electrical feedback connection 3 linking each sub-unit $X_i$ with its corresponding sub-unit $Y_i$.

As shown in the diagram, each sub-unit $Y_i$ transmits an excitatory signal according to the required activity and receives an inhibitory signal. Each $X_i$ transmits an inhibitory signal and receives an excitatory signal. External excitatory inputs are applied to $Y_i$, whereas external inhibitory inputs are applied to $X_i$. The details of the internal processing of a node are not discussed here, merely the method of interconnection. Additive or shunting retrievals may be implemented by a suitable combination of inhibitory and excitatory signals.

In more detail, and referring to the exploded view of a sub-unit $X_i$, it is similar to what is often referred to as a "smart pixel" and comprises an electronic circuit 5 which receives the external inhibitory input. In addition, there is a photodetector 6 which receives and sums the net lateral excitatory signals transmitted from the sub-units $Y_i$. The electronic circuit 5 provides the one-to-one electrical feedback signal on the connector 3. It also drives a light source 7 which transmits the optical inhibitory signal for the sub-units $Y_i$, this signal being dependent on the net optical output. Each $Y_i$ has a similar construction to the $X_i$ sub-units, with the exception of course that the electronic circuit does not provide a one-to-one feedback signal, but instead receives such a signal. Thus, the photodetector at each $Y_i$ calculates the net inhibitory input. The net activation of the sub-unit $Y_i$ can be computed using the optically delivered inhibitory signal, the external electrically delivered excitatory signal and the feedback signal. This is then thresholded to give a new output. The manner in which the excitatory and inhibitory signals are broadcast depends on the setting of the optical elements 2.

Figure 2:
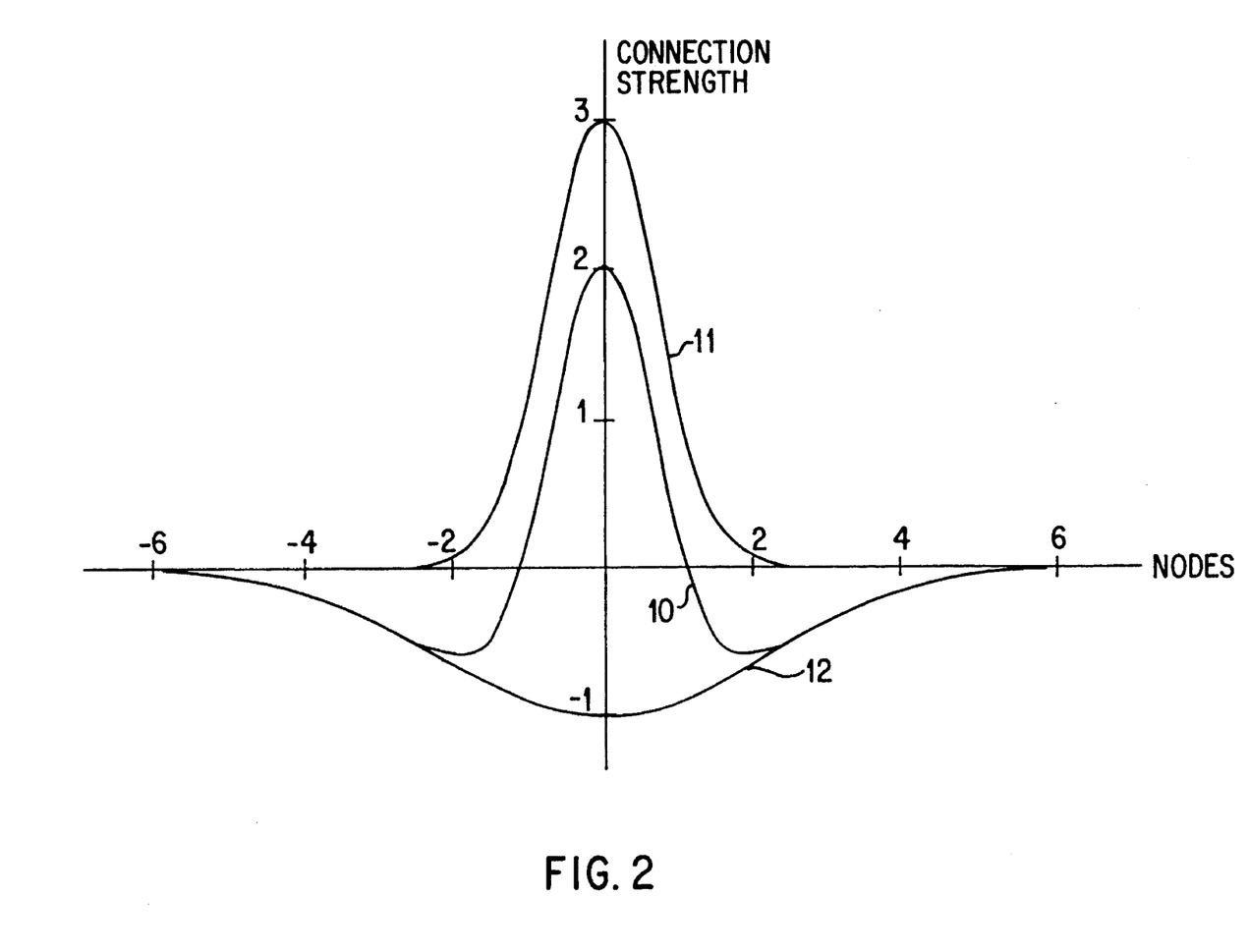
FIG. 2 is a graph illustrating the center/surround weight/distance mapping showing the interconnection of neurons in a layer of the invention in which there are both inhibitory and excitatory lateral interaction.

Referring now to FIG. 2, a typical interconnection scheme, often referred to as a "Mexican Hat," is illustrated. This may be achieved by the layer 1 of the invention as shown. An interaction line 10 showing strength of interconnection can be broken down into a strong local excitation 11 and a broader, weaker inhibition 12. This may therefore be used in establishing topographic mapping, and is achieved in the layer 1 because:

1. There are both excitatory and inhibitory lateral interconnections; and

2. From every neuron there are excitatory connections to near neighbors and inhibitory connections over a larger radius. This particular feature is achieved by the construction of the diffractive optical elements 2 and is illustrated by the arrowed lines of FIG. 1 showing the interconnection light signals.

Figure 3:
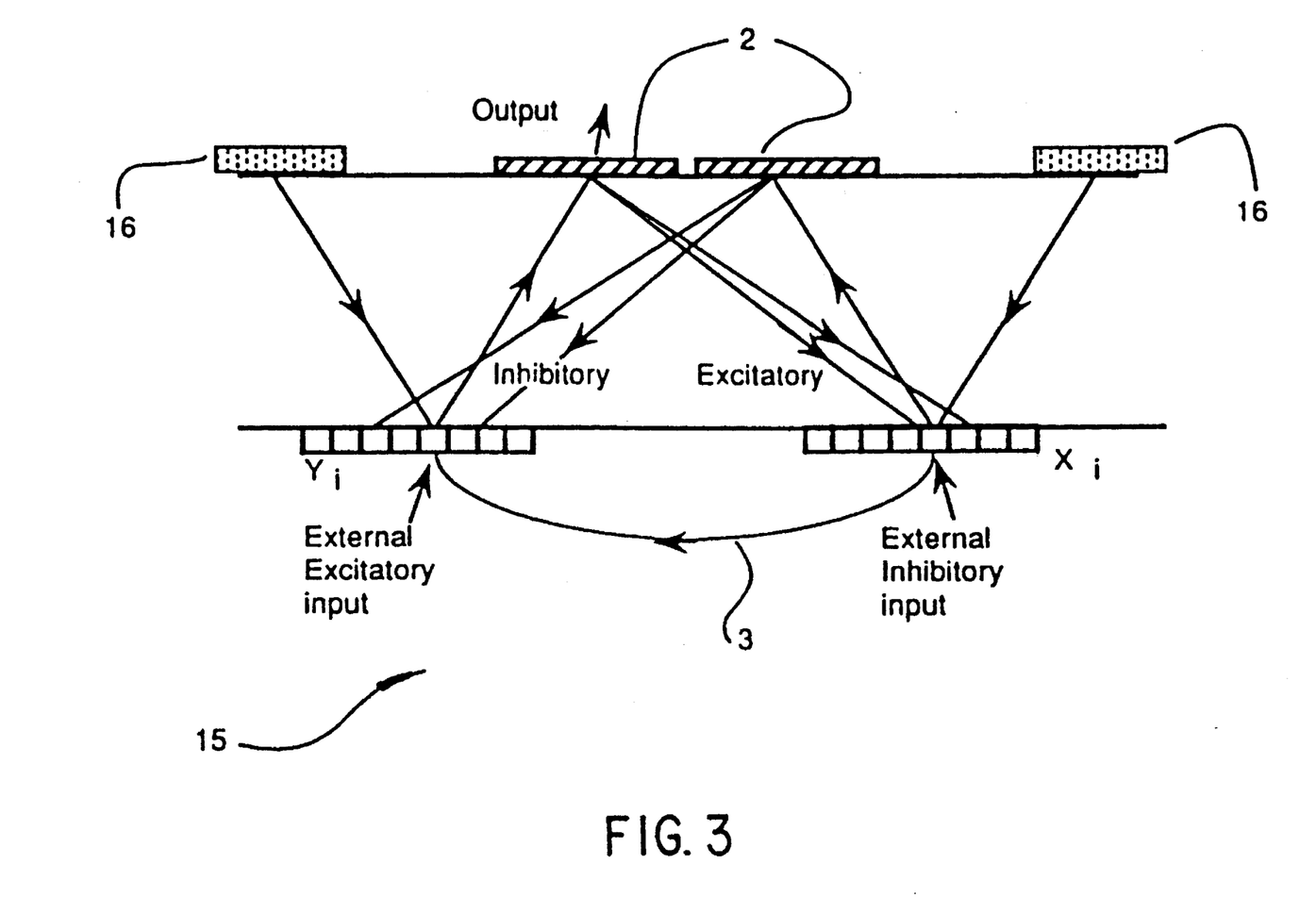
FIG. 3 is a diagrammatic view showing an alternative construction of a network of the invention.

In the neural network layer 1, each neuron sub-unit has an on-chip light source. For reasons of power and heat dissipation, it may be preferable to use an external optical power source with on-chip modulators. Such a neural network layer 15 is shown in FIG. 3. Parts similar to those described with reference to the previous drawings are identified by the same reference numerals. As shown, there is an external optical power source 16 driving on-chip modulators in the sub-units $X_i$ and $Y_i$. The modulators are of the GaAs asymmetric Fabry-Perot type which are integrated with the light detectors and electronics. Alternative technologies such as liquid crystal PLZT-on-silicon or GaAs-on-silicon, could be used.

The external optical power source may itself be modulated to provide an alternative means of introducing external excitatory and inhibitory input.

Figure 4:
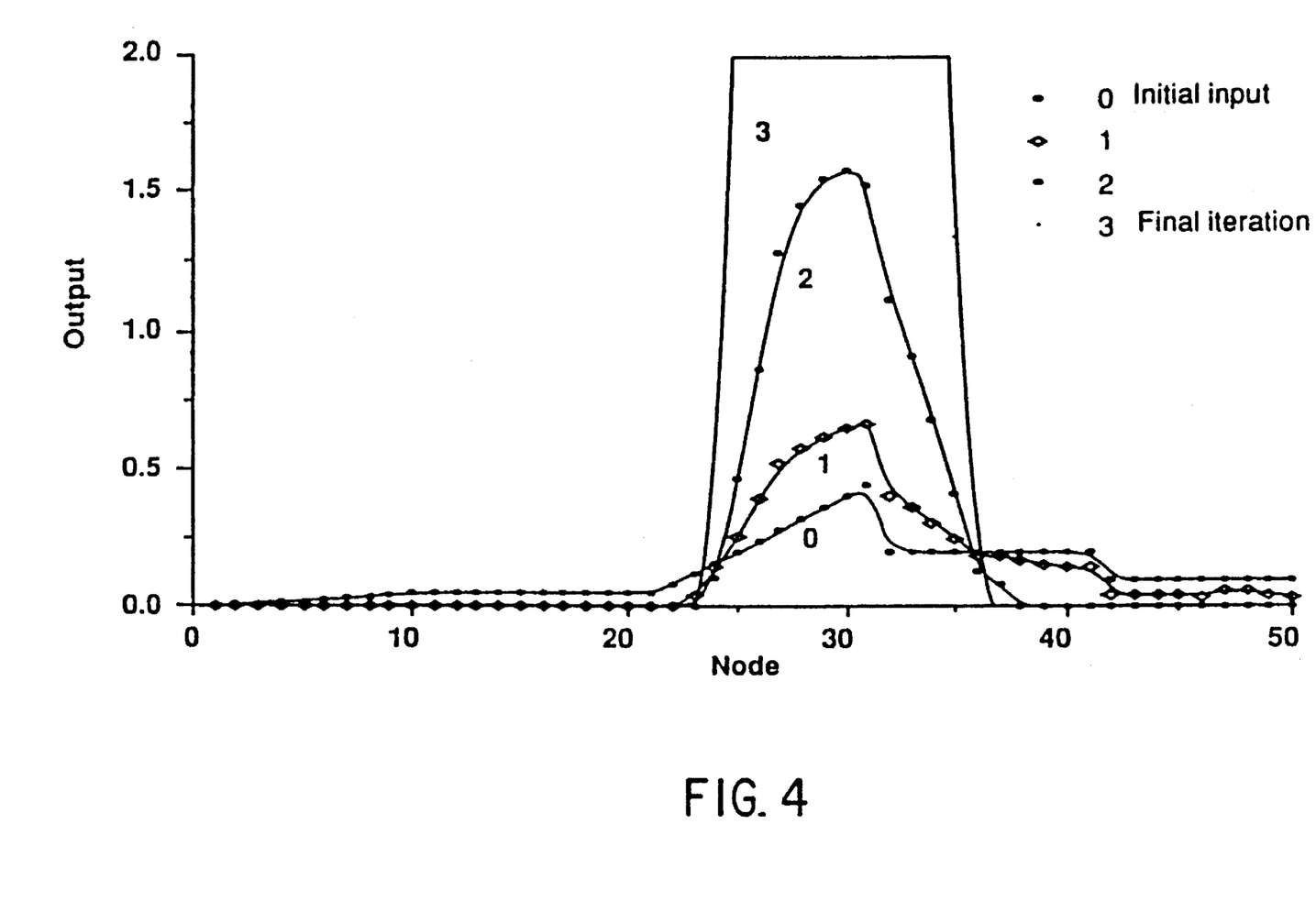
FIG. 4 is a graph showing simulation of the formation of a stable bubble of activity in a neural network of the invention.

In order to achieve stable bubbles of activity, suitable values of feedback parameters must be chosen for the particular system. The following simulation example with reference to FIG. 4 shows how this can be achieved.

Consider a simple additive network with external excitatory inputs only. The network is initialised with $Y_{i(0)}$=input pattern, $X_{i(0)}$=0, and then allowed to iterate to a final state. The sub-units $X_i$ and $Y_i$ are alternatively updated according to equations 1 and 2.

$$X_{i(t+1)} = X_{i(t)} + \alpha_{-a}\Sigma^{-a} Y_{i(t)} \qquad \text{Equ. 1}$$

$$Y_{i(t+1)} = f_{th}(Y_{i(t)} + X_{i(t+1)} - \beta_{-3a}\Sigma^{+3a} X_{i(t)}) \qquad \text{Equ. 2}$$

where $f_{th}$ is a threshold function. The values of $Y_i$ after sequential iterations are shown along with the threshold function $f_{th}$ used and the form of the lateral interaction. Values of feedback parameters $\alpha$=0.3, $\beta$=0.04, were used for input signal levels <0.1. The interaction width a=4, and the inhibition is three times as wide as the excitation, and has been squared off to simplify calculations. As shown in FIG. 4, a stable bubble of activity soon forms at the region of maximum input. The width of the bubble and the speed at which it forms depend on the feedback parameters. Not all combinations of values work, as would be expected for such a nonlinear system, but once stable behaviour is obtained, then small variations in any of the parameters do not have significant effect.

Figure 5:
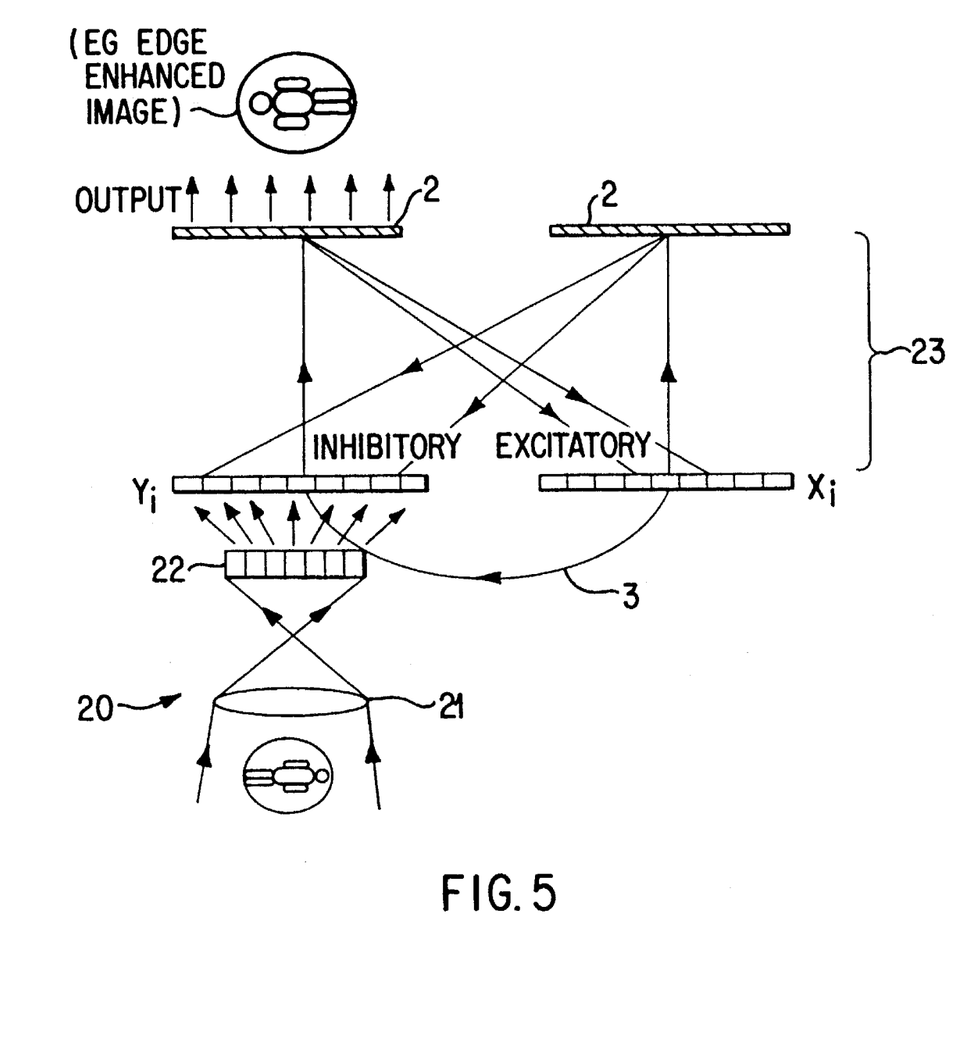
FIGS. 5 and 6 are diagrams showing neural networks incorporating the invention applied to image processing and self-organisation, respectively.
Figure 6:
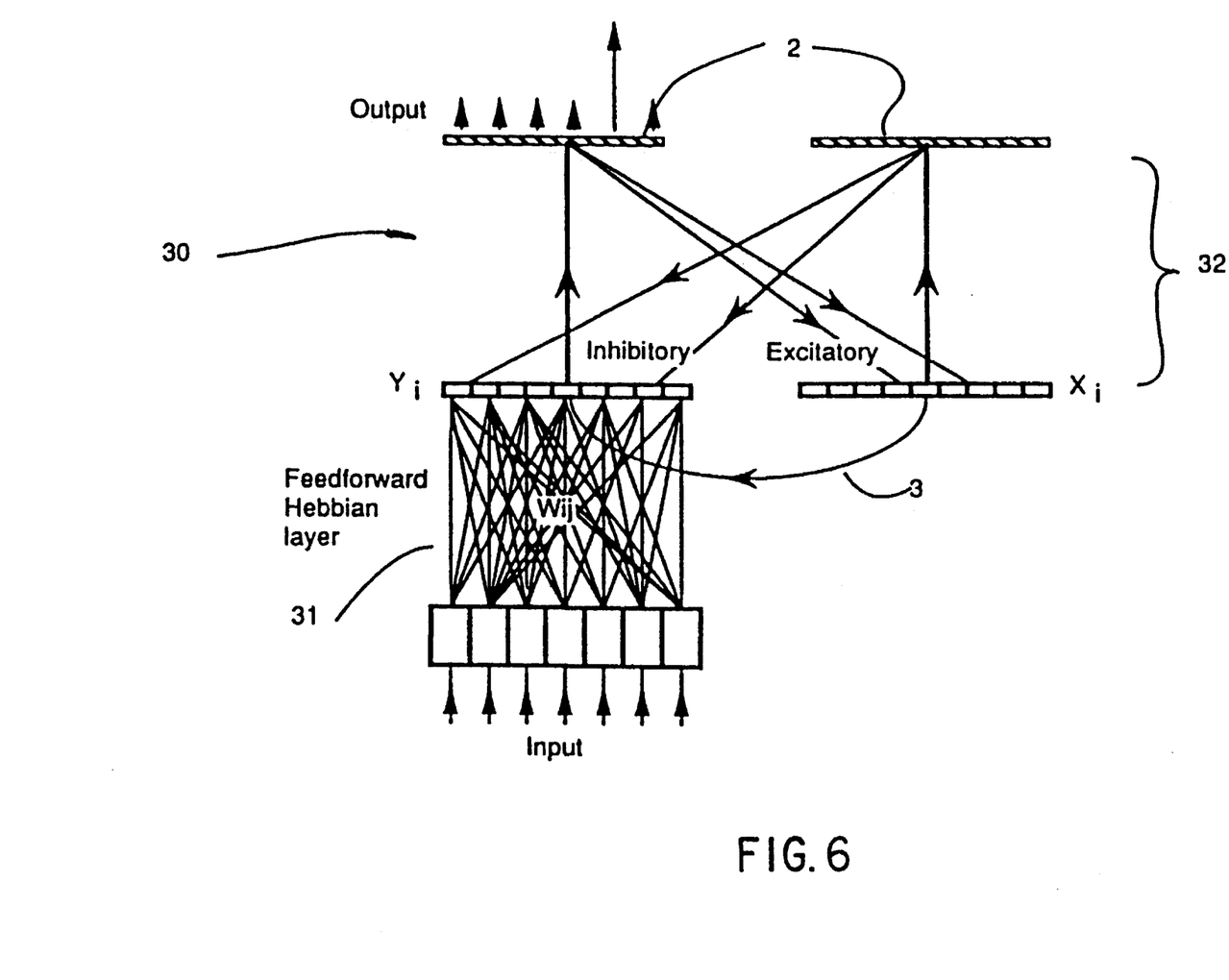

Referring now to FIGS. 5 and 6, two examples of how the invention may be applied are shown. In FIG. 5, an image processing system 20 is shown. The system 20 comprises a lens 21 mounted in front of a set of photodetectors 22. The photodetectors 22 are connected to an input layer 23 of a lateral neural network.

An external optical image is converted to an electrical signal to act as an external excitatory input to the neural network. No external inhibitory inputs are applied.

Because there are both excitatory and inhibitory interconnections and neighboring nodes also respond, and by use of suitable electronic processing (e.g. a shunting network) in the sub-units, a contrast-enhanced version of the input is obtained. The interaction is thus of the "Mexican Hat" type shown in FIG. 2.

If this contrast enhanced image is used in further processing, inhibitory signals may be fed back from higher layers or units.

Referring now to FIG. 6, a basic self-organising network 30 comprises a feed forward, full interconnected layer 31, where the weights Wij are determined by Hebbian learning. This feeds into a lateral interconnection layer 32, where the interconnection is again excitatory to near neighbors, and inhibitory over a broader range. Initially, the Wij are small and random. During learning various patterns are presented. These will lead to some output neuron being preferentially stimulated as indicated by the long arrow. The "winning" output neuron responds to that particular input. All connections between the winning neuron and the active input neurons are strengthened, which is the essence of a Hebbian-learning rule. By repeated presentation of patterns, the output nodes of the network will come to "specialise" in particular patterns or pattern elements, as determined by the Wij.

A random, disordered output can be obtained if only inhibitory connections are present in the network—a so called winner-take-all layer. For topographic organisation to arise, it is necessary that the near-neighbor excitatory interconnections be present also. This ensures that if a particular neuron responds to a given input, nearby nodes will also partly respond. Through the learning process neighboring output neurons will come to specialise in related or similar inputs, giving rise to topographic organisation. For good spatial organisation, the range of the excitatory interconnections should be broad, and then narrow during training to a final, small value. A static lateral interconnection scheme can be used if a local, modifiable inhibitory signal is applied to each node.

The invention is not limited to the embodiments hereinbefore described, but may be varied in construction and detail. For example, the manner in which neuron sub-units are coupled may be changed with time. This may be achieved, for example, using a computer-generated holographic pattern. Further, the feedback between sub-units may be optical instead of electrical. The embodiments have been described, for clarity, with the neurons or nodes in one dimension. However, it will be appreciated that in many practical applications they would be in two dimensions. Such layers would be extremely complex if constructed electrically, but would be relatively simple if implemented optically according to the invention. Further, it is envisaged that many different interconnection schemes may be used, depending on the application. This is because the invention provides a neural network structure which allows both positive and negative optical lateral interconnection.

What is claimed is:

1. A lateral neural network structure comprising:

a layer having a plurality of neurons, each of said plurality of neurons having at least two physically separate optical sub-units, one constructed for broadcasting lateral inhibitory signals and one constructed for broadcasting lateral excitatory signals; and means for optically coupling said sub-units in a bi-directional manner for broadcasting both inhibitory and excitatory lateral signals;

wherein sub-units constructed for broadcasting lateral inhibitory signals are located for reception of lateral excitatory signals and reception of external inhibitory inputs; and sub-units constructed for broadcasting lateral excitatory are located for reception of lateral inhibitory signals and reception of external excitatory inputs.

2. A neural network structure as claimed in claim 1, wherein the network structure layer comprises a feedback connection between sub-units.

3. A neural network structure as claimed in claim 2, wherein the feedback connection is a one-to-one connection between sub-units of a single neuron.

4. A neural network structure as claimed in claim 3, wherein the sub-units comprise on-chip light sources.

5. A neural network structure as claimed in claim 3, wherein the sub-units are constructed to receive light from an external source and comprise on-chip modulators for the received light.

6. A neural network structure as claimed in claim 2, wherein the sub-units comprise on-chip light sources.

7. A neural network structure as claimed in claim 2, wherein the sub-units are constructed to receive light from an external source and comprise on-chip modulators for the received light.

8. A neural network structure as claimed in claim 7, wherein the on-chip modulators are of the GaAs asymmetric Fabry-Perot type.

9. A neural network structure as claimed in claim 7, wherein the external source is modulated.

10. A neural network structure as claimed in claim 1, wherein the sub-units are constructed to receive light from an external source and comprise on-chip modulators for the received light.

11. A neural network structure as claimed in claim 10, wherein the on-chip modulators are of the GaAs asymmetric Fabry-Perot type.

12. A neural network structure as claimed in claim 10, wherein the external source is modulated.

13. A neural network structure as claimed in claim 11, wherein the optical coupling means is variable with time.

14. A neural network structure as claimed in claim 1, wherein the optical coupling means comprises holographic or diffractive optical elements.

15. A neural network structure as claimed in claim 14, wherein the optical coupling means comprises a computer-generated holographic pattern.

16. A neural network structure as claimed in claim 14, wherein the optical coupling means is variable with time.

17. A neural network structure as claimed in claim 1, wherein the optical coupling means is variable with time.

18. An image processing system incorporating a neural network structure as claimed in claim 1.

19. A self-organising network incorporating a neural network structure as claimed in claim 1.

20. A neural network structure as claimed in claim 1, wherein the network structure layer comprises a feedback connection between sub-units.

21. A neural network structure as claimed in claim 20, wherein the feedback connection is a one-to-one connection between sub-units of a single neuron.

22. A neural network structure as claimed in claim 21, wherein the sub-units comprise on-chip light sources.

23. A neural network structure as claimed in claim 21, wherein the sub-units are constructed to receive light from an external source and comprise on-chip modulators for the received light.

24. A neural network structure as claimed in claim 21, wherein the optical coupling means comprises holographic or diffractive optical elements.

25. A neural network structure as claimed in claim 21, wherein the optical coupling means is variable with time.

26. A neural network structure as claimed in claim 20, wherein the sub-units comprise on-chip light sources.

27. A neural network structure as claimed in claim 20, wherein the sub-units are constructed to receive light from an external source and comprise on-chip modulators for the received light.

28. A neural network structure as claimed in claim 27, wherein the on-chip modulators are of the GaAs asymmetric Fabry-Perot type.

29. A neural network structure as claimed in claim 27, wherein the external source is modulated.

30. A neural network structure as claimed in claim 20, wherein the optical coupling means comprises holographic or diffractive optical elements.

31. A neural network structure as claimed in claim 20, wherein the optical coupling means is variable with time.

32. A neural network structure as claimed in claim 1, wherein the sub-units comprise on-chip light sources.

33. A neural network structure as claimed in claim 1, wherein the sub-units comprise on-chip light sources.

34. A neural network structure as claimed in claim 33, wherein the optical coupling means comprises holographic or diffractive optical elements.

35. A neural network structure as claimed in claim 33, wherein the optical coupling means is variable with time.

36. A neural network structure as claimed in claim 1, wherein the sub-units are constructed to receive light from an external source and comprise on-chip modulators for the received light.

37. A neural network structure as claimed in claim 36, wherein the on-chip modulators are of the GaAs asymmetric Fabry-Perot type.

38. A neural network structure as claimed in claim 37, wherein the optical coupling means comprises holographic or diffractive optical elements.

39. A neural network structure as claimed in claim 36, wherein the external source is modulated.

40. A neural network structure as claimed in claim 39, wherein the optical coupling means comprises holographic or diffractive optical elements.

41. A neural network structure as claimed in claim 39, wherein the optical coupling means is variable with time.

42. A neural network structure as claimed in claim 36, wherein the optical coupling means comprises holographic or diffractive optical elements.

43. A neural network structure as claimed in claim 1, wherein the optical coupling means is variable with time.

44. A neural network structure as claimed in claim 36, wherein the optical coupling means is variable with time.

* * * * *

UNITED STATES PATENT AND TRADEMARK OFFICE
CERTIFICATE OF CORRECTION

PATENT NO. : 5,581,660
DATED : December 3, 1996
INVENTOR(S) : Paul Horan

It is certified that error appears in the above-identified patent and that said Letters Patent is hereby corrected as shown below:

IN THE ABSTRACT, lines 1, 6 & 9, respectively: Delete "(1)", "(20)" and "(2)", respectively.

| Column | Line | |
|---|---|---|
| 1 | 24 | Change "Large scale" to --Large-scale--. |
| 1 | 39 | Change "recurrent type". |
| 2 | 40 | Change "very - important" to --very important--. |
| 4 | 53 | After "e.g." insert --,--. |
| 4 | 61 | Change "full" to --fully--. |
| 5 | 53 | After "excitatory" insert --signals--. |

Signed and Sealed this

Tenth Day of June, 1997

Attest:

BRUCE LEHMAN

*Attesting Officer*    *Commissioner of Patents and Trademarks*